United States Patent
Indukuri et al.

(10) Patent No.: US 10,474,752 B2
(45) Date of Patent: Nov. 12, 2019

(54) SYSTEM AND METHOD FOR SLANG SENTIMENT CLASSIFICATION FOR OPINION MINING

(75) Inventors: Kishore Varma Indukuri, Tanuku Taluku (IN); Manuel Kantharaj, Mysore (IN); Radha Krishna Pisipati, Hyderabad (IN)

(73) Assignee: INFOSYS TECHNOLOGIES, LTD., Bangalore (IN)

( * ) Notice: Subject to any disclaimer, the term of this patent is extended or adjusted under 35 U.S.C. 154(b) by 430 days.

(21) Appl. No.: 13/325,144

(22) Filed: Dec. 14, 2011

(65) Prior Publication Data

US 2012/0259617 A1    Oct. 11, 2012

(30) Foreign Application Priority Data

Apr. 7, 2011    (IN) .......................... 1197/CHE/2011

(51) Int. Cl.
*G06F 17/27*    (2006.01)
*G06F 17/28*    (2006.01)

(52) U.S. Cl.
CPC ........ *G06F 17/274* (2013.01); *G06F 17/2785* (2013.01); *G06F 17/277* (2013.01); *G06F 17/289* (2013.01)

(58) Field of Classification Search
CPC ... G10L 15/19; G10L 15/183; G10L 15/1815; G10L 15/1822; G06F 17/2785; G06F 17/30705; G06F 17/30707
USPC ...................................................... 704/1–10
See application file for complete search history.

(56) References Cited

U.S. PATENT DOCUMENTS

| | | | | |
|---|---|---|---|---|
| 7,814,029 | B1 * | 10/2010 | Siegel | G06Q 30/02 705/1.1 |
| 7,930,302 | B2 * | 4/2011 | Bandaru | G06F 16/951 707/737 |
| 8,010,539 | B2 * | 8/2011 | Blair-Goldensohn et al. | 707/750 |
| 8,463,595 | B1 * | 6/2013 | Rehling et al. | 704/9 |
| 2006/0200341 | A1 * | 9/2006 | Corston-Oliver et al. | 704/5 |
| 2006/0200342 | A1 * | 9/2006 | Corston-Oliver et al. | 704/10 |
| 2008/0133488 | A1 * | 6/2008 | Bandaru | G06F 17/30864 |
| 2008/0270116 | A1 * | 10/2008 | Godbole et al. | 704/9 |
| 2009/0319436 | A1 * | 12/2009 | Andra | G06F 17/2785 705/80 |

(Continued)

OTHER PUBLICATIONS

Nielsen, F. Å. (2011). A new ANEW: Evaluation of a word list for sentiment analysis in microblogs.*

(Continued)

*Primary Examiner* — Michael Ortiz-Sanchez
(74) *Attorney, Agent, or Firm* — Pepper Hamilton LLP

(57) ABSTRACT

The present disclosure describes a method of sentiment oriented slang for opinion mining. With increasing use of internet, many users can submit their review comments directly to the companies which can be automatically processed and summarized with critical issues from time to time and help the company get real time feedback from its customers. The method comprises, receiving at least one document comprising a plurality of sentiment oriented slang. The next step of the method comprises identifying the plurality of sentiment oriented slang in the at least one document. Further, a polarity score of each of a slang word identified is determined and sentiment information is displayed on an output device as an output.

21 Claims, 3 Drawing Sheets

(56) References Cited

U.S. PATENT DOCUMENTS

| | | | |
|---|---|---|---|
| 2011/0238408 A1* | 9/2011 | Larcheveque et al. | 704/9 |
| 2011/0246179 A1* | 10/2011 | O'Neil | 704/9 |
| 2012/0046938 A1* | 2/2012 | Godbole et al. | 704/9 |
| 2012/0101808 A1* | 4/2012 | Duong-Van | 704/9 |
| 2012/0215903 A1* | 8/2012 | Fleischman | G06Q 30/0201 709/224 |
| 2012/0259617 A1* | 10/2012 | Indukuri | 704/9 |
| 2013/0036126 A1* | 2/2013 | Anderson | G06F 17/3061 707/754 |
| 2013/0103386 A1* | 4/2013 | Zhang et al. | 704/9 |
| 2014/0095148 A1* | 4/2014 | Berjikly et al. | 704/9 |
| 2014/0095149 A1* | 4/2014 | Berjikly et al. | 704/9 |

OTHER PUBLICATIONS

Boiy, Erik, et al. "Automatic sentiment analysis in on-line text." ELPUB. 2007.*

Pak, Alexander, and Patrick Paroubek. "Twitter as a Corpus for Sentiment Analysis and Opinion Mining." LREC. 2010.*

* cited by examiner

SYSTEM AND METHOD FOR SLANG SENTIMENT CLASSIFICATION FOR OPINION MINING

This application claims the benefit of Indian Patent Application Filing No. 1197/CHE/2011, filed Apr. 7, 2011, which is hereby incorporated by reference in its entirety.

TECHNICAL FIELD

The present disclosure relates to the field of opinion mining, and particularly, to a system and a method for slang sentiment classification for opinion mining.

BACKGROUND

Most of the successful systems for sentiment classification present in the art are custom developed for the domain which involves huge cost in building and maintenance. They use the conventional features like lexical, semantic and patterns. Huge lookup databases are built to boost the accuracy of the tools. Heavy analysis on the grammar which is used in the training set which represents specific category of documents is provided as intelligence in the tool. The tools accuracy heavily depends on the training data as they represent the entire text for which the tool is built. Hence, most of these systems are not easily configurable or extendable. They involve heavy maintenance from time to time. Hence, such systems are very expensive for the companies to put to use.

Machine learning models provide easy maintenance but the training data need to be huge to represent the domain. In-depth technical knowledge is required to understand the behavior of such models and reason the results or mistakes made in prediction of the polarity scores. Therefore, Machine learning models are still not widely to predict polarity scores. So, there is a need in the art to build a solution, for slang sentiment classification for opinion mining which also calculates the polarity score.

SUMMARY OF THE INVENTION

The present disclosure proposes using Slang sentiment along with the conventional sentiment analysis framework to obtain accurate sentiment scores for the given input text. This adds additional information and intelligence to the tools and helps them predict sentiment scores with more precision.

Aspects of the disclosure relate to system and a method for slang sentiment classification for opinion mining. One of the embodiments of the present disclosure describes method for slang sentiment classification and calculating the polarity score.

According to the one aspect of the present disclosure, a method for slang sentiment classification and calculating the polarity score comprises the steps of receiving at least one document which comprises a plurality of sentiment oriented slang words. The at least one document can be but not limited to a review database or a word document or a webpage. The method of the present embodiment also includes the step of identifying the plurality of sentiment oriented slang from the at least one document. Further, the method comprises the step of determining a polarity score of each of a slang word identified. The slang words are identified from the previous step for which the polarity score is calculated. The polarity score is calculated by referring to a separate database. The method of the present embodiment further comprises the step of displaying the overall sentiment information of the at least one document on an output device.

In the embodiment of the present disclosure, the plurality of sentiment oriented slang is classified to a subjective context and an objective content. The slang words in the subjective context are identified and the polarity score of each of the slang word is determined by referring to a value from a database. The plurality of sentiment oriented slang is identified by accessing at least one database, wherein the database can be but not limited to a slang dictionary. The overall polarity score of the at least one document is computed wherein the overall polarity score is the weighted summation of all the polarity scores of each of the slang word. The polarity score can be one or more of but not limited to: a strong negative score S1, a weak negative score S2, a neutral score S3, a weak positive score S4 and a strong positive score S5. The at least one document can be one or more of but not limited to a blog, a website, a text document or a document from the review database.

In the embodiment of the present disclosure, the occurrence of each slang word in the at least one document is identified and the count of the number of occurrence of the slang word is stored. A sentiment information is a report based on the overall polarity score of the at least one document is displayed on an output device. The output device can be one or more but not limited to a computer monitor, a handheld device.

In another embodiment of the present disclosure, a system for sentiment classification and polarity scoring comprises a data gathering module configured to receive at least one input from at least one database. The at least one input can be one or more of: a blog, a website, a text document or data from a review database. The embodiment of the present disclosure further comprises a data preparation module configured to receive an input from the data gathering module and transforms the input to a common format by normalizing the data. The system also comprises a sentiment classification module configured to receive input from the data preparation module, identify a plurality of sentiment oriented slang from at least one document and calculate a polarity score of each slang word. The sentiment classification module is configured to classify the plurality of sentiment oriented slang to subjective context and an objective context. The sentiment classification module is further configured to compute an overall polarity score, wherein the overall polarity score is the weighted summation of all polarity score. The polarity score is computed by referring to a value, wherein the value is the number of occurrences of each slang word. The polarity score can be one or more of a strong negative score S1, a weak negative score S2, a neutral score S3, a weak positive score S4 and a strong positive score S5. The plurality of sentiment oriented slang is identified by referring to a slang dictionary. The sentiment classification module is further configured to count an occurrence the plurality of sentiment oriented slang. The at least one database is a review database. The sentiment classification module can also be configured to recomputed the polarity score for modifications in the at least one input. The system of the preferred embodiment further comprises an output module operable to communicate with the sentiment classification module; the output module displays an output on an output device. The output module is configured to display the output based on the overall polarity score of the at least one input. The output is a sentiment information based on the overall polarity score of the at least one input.

The output device can be one or more of but not limited to a computer monitor, a handheld device and a computer monitor.

One of the preferred embodiments of the sentiment analysis is identifying the polarity of a text as positive, negative or neutral with the help of features. It helps in understanding the attitude of customers towards a product. This analysis is really crucial for all the customer centric companies in knowing the right requirements of customers or enhancements in their products. In practice, the conventional sentiment analysis tools use the linguistic, semantic and pattern based approaches. Many of these tools are domain specific tools which take advantage of the language which is used in their respective domains. Every consumer has his own opinion about the product he is using which they are willing to share in social groups like forums, chat rooms and weblogs. As these review comments are actual feedbacks from customers, mining the sentiments in these reviews is being increasingly inducted into the feedback pipeline for any company. Along with it, the increasing use of slang in such communities in expressing emotions and sentiment makes it important to consider Slang in determining the sentiment.

DRAWINGS

These and other features, aspects, and advantages of the present invention will be better understood when the following detailed description is read with reference to the accompanying drawings in which like characters represent like parts throughout the drawings, wherein.

DETAILED DESCRIPTION

Figure 1:
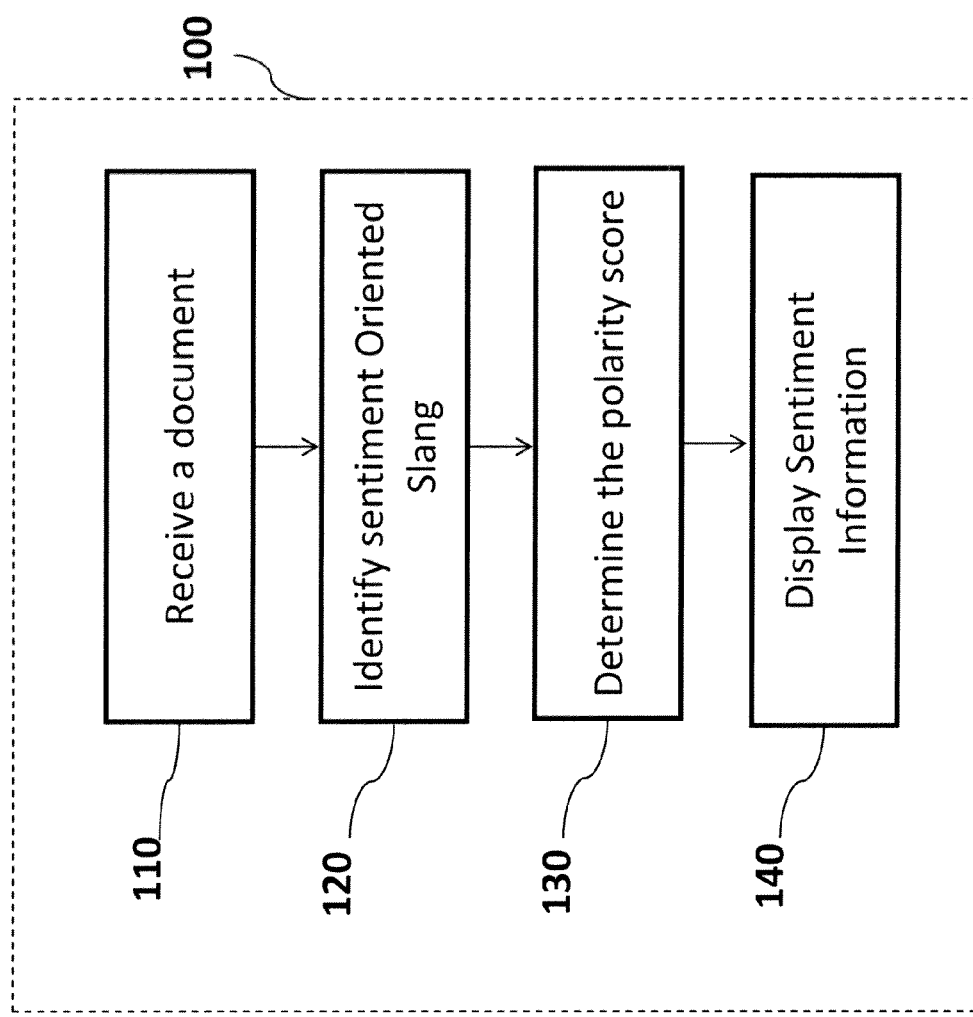
FIG. 1 is a flow chart illustrating a method 100 for slang sentiment classification, in accordance with an embodiment of the present disclosure.

The present disclosure proposes a method for slang sentiment classification for opinion mining. FIG. 1 is a flow chart illustrating a method 100 for slang sentiment classification, in accordance with an embodiment of the present disclosure. Method 100 includes a step 110 receiving at least one document comprising a plurality of sentiment oriented slang. The at least one document can be one or more of but not limited to a blog, a website and a text document which can be received from a review database. The at least one documents are the articles obtained for analysis. They can also be received from web-crawlers or third party databases, or customer data files.

Step 120, involves identifying the plurality of sentiment oriented slang in the at least one document. One of the embodiments of the present disclosure includes classifying the sentiment oriented slang into subjective context and objective context. The slang words in the subjective content are identified. The matter of the objective content can be filtered or retained. Identifying the plurality of sentiment oriented slang can also be done by accessing at least one database to refer to the plurality of sentiment oriented slang. The at least one database can be but not limited to a slang dictionary. Further, the occurrence of each slang word is identified, counted and stored. The polarity score can be calculated by referring to a value, wherein the value is the number of occurrence of each slang word.

At step 130, the polarity score of each of the slang word that is identified is determined The slang words are identified in the subjective context and a polarity score for each of those slang words are computed using a processor. The processor can be but not limited to a general purpose computer, a specific personal computer or a handheld device capable of performing a set of instructions. The polarity score of the slang word can be determined by accessing at least one database to refer to a value. The at least one database can be a slang dictionary. The value that is stored in the at least one database is the number of occurrences of each of the slang word. The overall polarity score is computed, wherein the overall polarity score is the weighted summation of all polarity score. The polarity score can be one or more of, but not limited to a strong negative score S1, a weak negative score S2, a neutral score S3, a weak positive score S4 and a strong positive score S5. The polarity score can be configured to add additional polarity scores, or delete the extra polarity scores. The configuration of S1, S2, S3, S4 and S5 can be accordingly altered. The polarity of the slang word can be computed using Delta TF and weighted IDF measures as explained. If ft,d gives the corresponding features frequency in document d and if |N| and |P| are the total positive and negative corpus size, if Nt and Pt correspond to the effective number of documents containing t in the negatively and positively labeled sets, then the Vt,d, which is the value of feature t in document d, is given by:

$$Vt,d = ft,d * \log 2(|N|/Nt) - ft,d * \log 2(|P|/Pt) \quad (1)$$

Since our illustrative training sets are balanced, equation 1 becomes:

$$Vt,d = ft,d\_\log 2(Pt/Nt) \quad (2)$$

The scores Nt and Pt, which are effective number of documents in positive and negative corpus containing term t is given by ((S1*2)+S2) and ((S5*2)+S4) respectively. Hence these metrics assign occurrences in stronger positive and negative corpus documents (documents in Sets S1, S5 respectively) twice the importance of the occurrence in corresponding relatively weaker documents (documents in sets S2 and S4).

In many of the cases, a document sentiment score can be calculated by finding the difference of that words TFIDF scores in the positive and negative training corpora. If the score is greater than zero, then we can expect the document to be a positive opinion and otherwise if the score is less than zero, the document is expected to represent a negative opinion. This method can be easily extended to find the sentiment score of the newly discovered slang word or word phrase. If t represents the newly discovered slang word or phrase (i.e. the word t represents both the slang short form and the actual word phrase or word for the corresponding slang representation), the sentiment score for t can be calculated as:

$$\text{Score}t = 2(\Sigma d \text{ in } S5 Vt,d - \Sigma d \text{ in } S1 Vt,d) + (\Sigma d \text{ in } S4 Vt,d - \Sigma d \text{ in } S2 Vt,d) \quad (3)$$

At step 140, the sentiment information is displayed on an output device. The sentiment information is a report based on the overall polarity score of the at least one document. The output device can be but not limited to a computer monitor, a hand held device.

Figure 2:
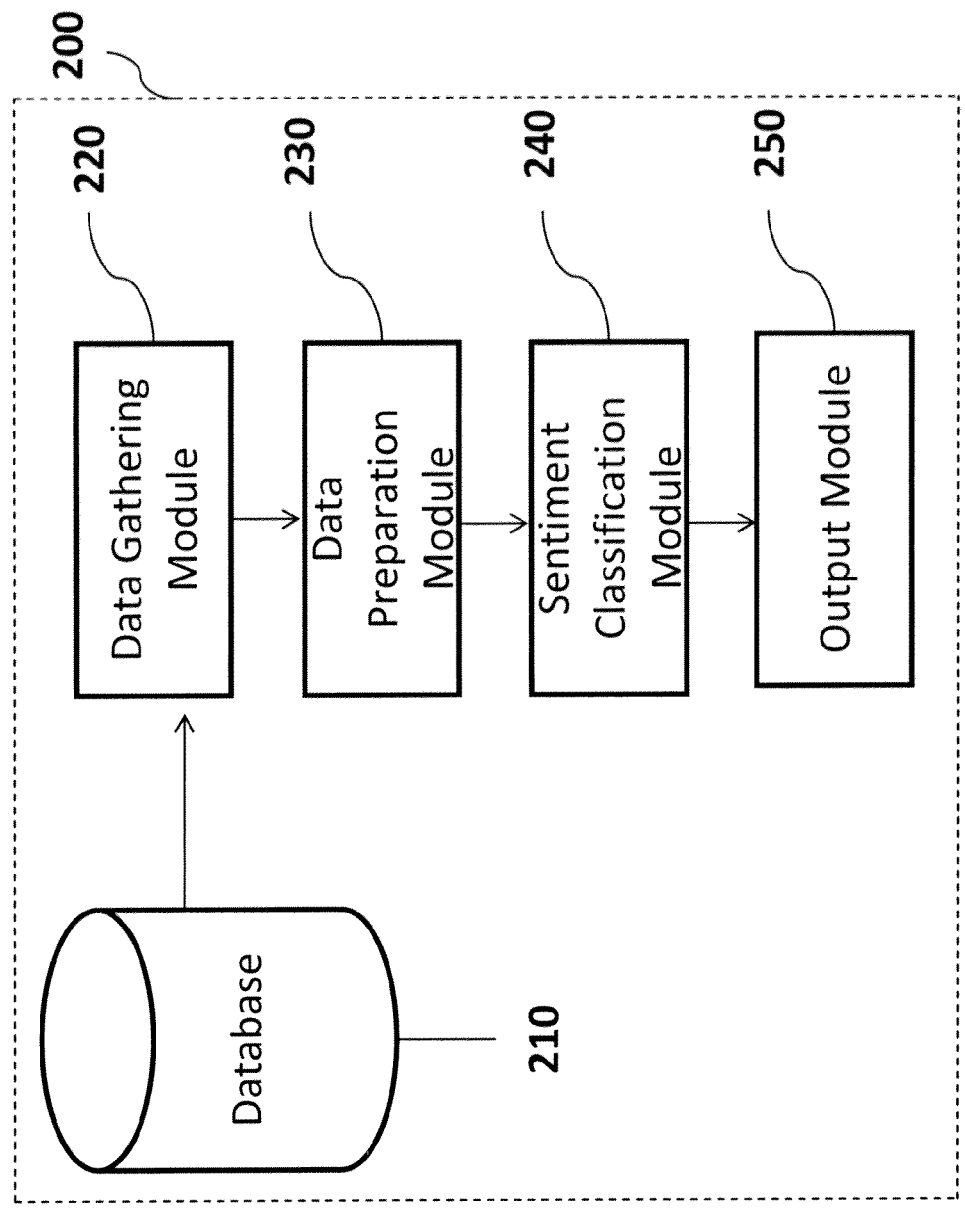
FIG. 2 is a block diagram illustrating a system 200 for slang sentiment classification, in accordance with an embodiment of the present disclosure.

FIG. 2 is a block diagram illustrating a system 200 for slang sentiment classification, in accordance with an embodiment of the present disclosure. System 200 includes a database 210, a data gathering module 220, a data preparation module 230, a sentiment classification module 240 and an output module 250.

The data gathering module 220 is configured at least one input from at least one database 210. The at least one input can be but not limited to a blog, a website or a text document. The at least one database 210 is a review database. The at least one documents are the articles obtained for analysis. They can also be received from web-crawlers or third party databases, or customer data files.

The data preparation module 230 configured to receive an input from the data gathering module 220, the data preparation module 230 transforms the input received from the data gathering module 220. The data preparation module 230 prepares the data by transforming, filtering and cleaning data to make it ready for further processing in next modules. The data is normalized into a common format. i.e. as the data sources can be any of xml, html, relation database and files, etc. There is a need to bring them into a common format. This is required to make the data source transparent to next steps in processing.

The system of the present embodiment further comprises a sentiment classification module 240. The sentiment classification module configured to receive input from the data preparation module. The sentiment classification module can also be further configured to identify a plurality of sentiment oriented slang in at least one document and calculate a polarity score of each slang word. In the present embodiment of the disclosure, the sentiment classification module can be configured to classify the plurality of sentiment oriented slang to a subjective context and an objective context. The sentiment classification module 240 can compute the polarity score for each slang word identified in the subjective context. The plurality of sentiment oriented slang is identified by referring to a slang dictionary. The number of occurrences of each slang word is identified and stored as a value. This value can be referred while computing the polarity score of the slang words. The sentiment classification module 240 can also compute the overall polarity score, wherein the overall polarity score is the weighted summation of all the polarity scores. The polarity score can be one or more of, but not limited to a strong negative score S1, a weak negative score S2, a neutral score S3, a weak positive score S4 and a strong positive score S5. The polarity score can be configured to add additional polarity scores, or delete the extra polarity scores.

In another embodiment of the present disclosure, the sentiment classification module 240 can be configured to recomputed the polarity score for modifications in the at least one input. The modifications can be a new subject matter which can be added, deleted or edited.

In another embodiment of the present disclosure, the sentiment classification module 240 can further comprise three modules. A WordNet Similarity Sentiment module configured to perform semantic similarity analysis on the articles using dictionaries/ontologies like WordNet. A WordPhrase Sentiment module which can be configured as the place holder for traditional sentiment analysis engines. The WordPhrase Sentiment module can predict the sentiment of a word phrase. A Slang Sentiment module which can be configured to only compute the slang scores.

In another embodiment of the present disclosure, the data preparation module 230 can comprise six modules. A Document Parser module configured to parse various document types such as Data streams, PDF, XLS, XML, HTML, CSV, txt files. A Data Filter module configured to filter data based on requirements. A Sub-Obj Classifier module configured to tag each of the sentence with Subjective or Objective labels. This may be necessary because many of the times, you find WordPhrase sentiment scorer and Slang sentiment scorers using only subjective sentences and ignoring objective sentences. A Word Feature Vector module configured: to contain a feature vectors which has all the words listed as features and frequencies as their respective feature values. A Semantic Feature Extractor module which can be configured to make use of semantic dictionaries like WordNet to find the semantic categories or synsets to which the words belong. The semantic feature extractor module can also be configured to categorize or synsets as features and their frequencies as the feature values. A POS Feature Extractor module which can be configured to feature extractor labels each words of sentences at a time with their POS labels such as Nouns, Verbs, Adjectives, etc. these POS labels would be used as feature names and their frequencies are used as feature values.

An output module 250 can be configured to communicate with the sentiment classification module and display the output on an output device. The output is a sentiment information based on the overall polarity score of the at least one input. The output device can be but not restricted to a computer monitor and a hand-held device.

For better illustration of the above described method 100 and system 200, consider at least one input in the form of a word document which contain 10 reviews. The at least one document is received according to step 110 by a data gathering module 220. A plurality of sentiment oriented slang is identified only from the subjective context of the word document as per the step 120 of the method 100. The data preparation module 230 transforms the received input to a common format suited for further processing. According to step 130, after identifying the slang words in the word document, the polarity score of each of the slang word is calculated using a value wherein the value is the number of occurrences of each slang word along with the equations mentioned by the sentiment classification module 240. According to the step 140, sentiment information which is based on the overall weighted summation of all the polarity score is displayed on the output device by an output module 250. The sentiment information is a report which can be used as a review.

Figure 3:
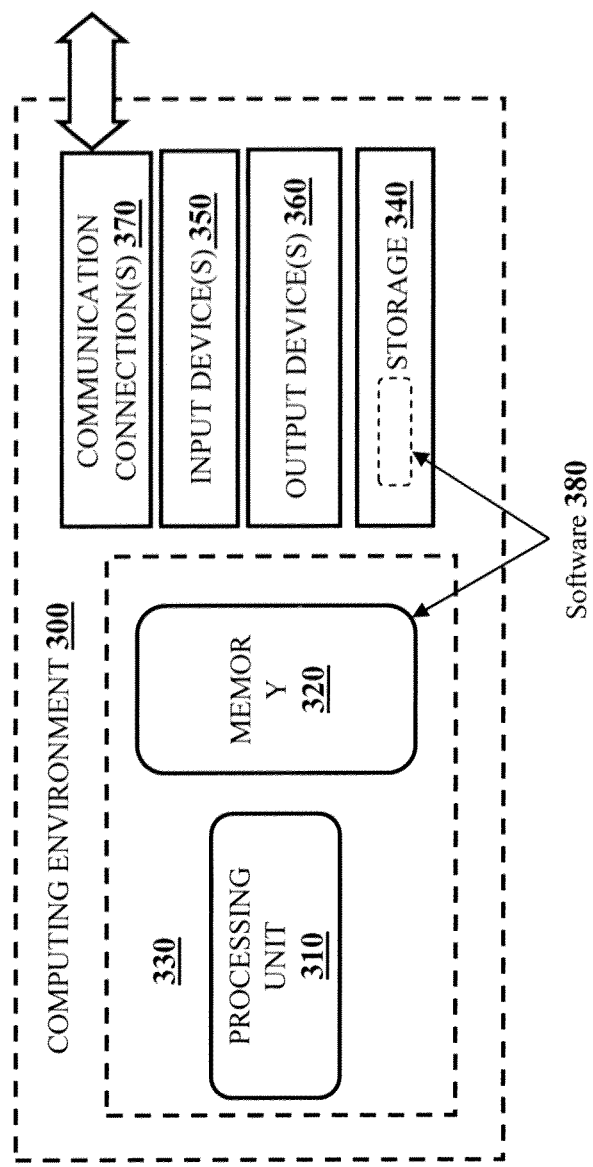
FIG. 3 is a system illustrating a generalized computer network arrangement, in accordance with an embodiment of the present invention.

One or more of the above-described techniques may be implemented in or involve one or more computer systems. FIG. 3 illustrates a generalized example of a computing environment 300. The computing environment 300 is not intended to suggest any limitation as to scope of use or functionality of described embodiments.

With reference to FIG. 3, the computing environment 300 includes at least one processing unit 310 and memory 320. In FIG. 3, this most basic configuration 330 is included within a dashed line. The processing unit 310 executes computer-executable instructions and may be a real or a virtual processor. In a multi-processing system, multiple processing units execute computer-executable instructions to increase processing power. The memory 320 may be volatile memory (e.g., registers, cache, RAM), non-volatile memory (e.g., ROM, EEPROM, flash memory, etc.), or some combination of the two. In some embodiments, the memory 320 stores software 380 implementing described techniques.

A computing environment may have additional features. For example, the computing environment 300 includes storage 340, one or more input devices 350, one or more output devices 360, and one or more communication connections 370. An interconnection mechanism (not shown)

such as a bus, controller, or network interconnects the components of the computing environment 300. Typically, operating system software (not shown) provides an operating environment for other software executing in the computing environment 300, and coordinates activities of the components of the computing environment 300.

The storage 340 may be removable or non-removable, and includes magnetic disks, magnetic tapes or cassettes, CD-ROMs, CD-RWs, DVDs, or any other medium which may be used to store information and which may be accessed within the computing environment 300. In some embodiments, the storage 340 stores instructions for the software 380.

The input device(s) 350 may be a touch input device such as a keyboard, mouse, pen, trackball, touch screen, or game controller, a voice input device, a scanning device, a digital camera, or another device that provides input to the computing environment 300. The output device(s) 360 may be a display, a television, a hand held device, a head mounted display or a Kiosk that provides output from the computing environment 300.

The communication connection(s) 370 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 300, computer-readable media include memory 320, storage 340, communication media, and combinations of any of the above.

Having described and illustrated the principles of our invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A method comprising:
   mining, by a data processing computing device, at least one database to obtain at least one electronic document comprising textual data about a product;
   transforming, by the data processing computing device, the textual data in the at least one electronic document to a common electronic format, wherein the transforming further comprises normalization of the textual data;
   classifying, by the data processing computing device, the transformed textual data into subjective context or objective context, wherein the classifying further comprises inserting a tag in the textual data based on the classification;
   identifying, by the data processing computing device, at least one of a plurality of sentiment oriented slang terms in the transformed textual data with the inserted subjective context tag;
   determining, by the data processing computing device, a polarity score for each of the identified at least one of the plurality of sentiment oriented slang terms based on a calculated value for each of the identified at least one of the plurality of sentiment oriented slang terms;
   transforming, by the data processing computing device, the determined polarity of score for each of the identified at least one of the plurality of sentiment oriented slang terms based on a weighting factor applied to at least one of the determined polarity of scores for each of the identified at least one of the plurality of sentiment oriented slang terms to determine a sentiment score; and
   outputting, by the data processing computing device, a sentiment classification of the product based on the determined sentiment score.

2. The method of claim 1, wherein the identifying is based at least in part on the context of the at least one of the plurality of sentiment oriented slang terms.

3. The method of claim 1, wherein the sentiment score further comprise a summation of the determined one or more polarity scores.

4. The method of claim 1, wherein the at least one document is based on a textual data source comprising:
   a blog,
   a web site, or
   a text document.

5. The method of claim 1, wherein the determined one or more polarity scores comprise:
   a strong negative score S1,
   a weak negative score S2,
   a neutral score S3,
   a weak positive score S4, or
   a strong positive score S5.

6. The method of claim 1, wherein the term frequency-inverse document frequency analysis is based on the frequency of the at least one of the plurality of sentiment oriented slang terms in the at least one document relative to the frequency of the at least one of the plurality of sentiment oriented slang terms in a corpus.

7. The method of claim 1, further comprising:
   identifying, by the data processing computing device, at least one of a plurality of sentiment oriented slang terms in the textual data that is classified as objective context; and
   determining, by the data processing computing device, one or more polarity scores corresponding to each of the identified at least one of the plurality of sentiment oriented slang terms.

8. A data processing computing device comprising:
   at least one processor;
   a memory coupled to the processor and configured to be capable of executing programmed instructions comprising and stored in the memory to:
     mine at least one database to obtain at least one electronic document comprising textual data about a product;

transform the textual data in the at least one electronic document to a common electronic format, wherein the transform further comprises normalization of the textual data;

classify the transformed textual data into subjective context or objective context, wherein the classifying further comprises inserting a tag in the textual data based on the classification;

identify at least one of a plurality of sentiment oriented slang terms in the transformed textual data with the inserted subjective context tag;

determine a polarity score for each of the identified at least one of the plurality of sentiment oriented slang terms based on a calculated value for each of the identified at least one of the plurality of sentiment oriented slang terms;

transform the determined polarity of score for each of the identified at least one of the plurality of sentiment oriented slang terms based on a weighting factor applied to at least one of the determined polarity of scores for each of the identified at least one of the plurality of sentiment oriented slang terms to determine a sentiment score; and output a sentiment classification of the product based on the determined sentiment score.

9. The device of claim 8, wherein the sentiment score further comprise a summation of the determined one or more polarity scores.

10. The device of claim 8, wherein the determined one or more polarity scores comprise:
a strong negative score S1,
a weak negative score S2,
a neutral score S3,
a weak positive score S4, or
a strong positive score S5.

11. The device of claim 8, wherein the at least one document is based on a textual data source comprising:
a blog,
a web site, or
a text document.

12. The device of claim 8, wherein the identifying is based at least in part on the context of the at least one of the plurality of sentiment oriented slang terms.

13. The device of claim 8, wherein the term frequency-inverse document frequency analysis is based on the frequency of the at least one of the plurality of sentiment oriented slang terms in the at least one document relative to the frequency of the at least one of the plurality of sentiment oriented slang terms in a corpus.

14. The device of claim 8, wherein the processor is further configured to be capable of executing programmed instructions, which comprise the instructions stored in the memory to:
identify at least one of a plurality of sentiment oriented slang terms in the textual data that is classified as objective context; and
determine one or more polarity scores corresponding to each of the identified at least one of the plurality of sentiment oriented slang terms.

15. A non-transitory computer readable medium having stored thereon instructions for sentiment mining comprising machine executable code which when executed by at least one processor, causes the processor to perform steps comprising:

mining at least one database to obtain at least one electronic document comprising textual data about a product;

transforming the textual data in the at least one electronic document to a common electronic format, wherein the transforming further comprises normalization of the textual data;

classifying the transformed textual data into subjective context and objective context;

identifying at least one of a plurality of sentiment oriented slang terms in the transformed textual data that is classified as subjective context;

determining a polarity score for each of the identified at least one of the plurality of sentiment oriented slang terms based on a calculated value for each of the identified at least one of the plurality of sentiment oriented slang terms;

transforming the determined polarity of score for each of the identified at least one of the plurality of sentiment oriented slang terms based on a weighting factor applied to at least one of the determined polarity of scores for each of the identified at least one of the plurality of sentiment oriented slang terms to determine a sentiment score; and outputting a sentiment classification of the product based on the determined sentiment score.

16. The non-transitory computer readable medium of claim 15, wherein the identifying is based at least in part on the context of the at least one of the plurality of sentiment oriented slang terms.

17. The non-transitory computer readable medium of claim 15, wherein the sentiment score further comprise a summation of the determined one or more polarity scores.

18. The non-transitory computer readable medium of claim 15, wherein the at least one document is based on a textual data source comprising:
a blog,
a web site, or
a text document.

19. The non-transitory computer readable medium of claim 15, wherein the determined one or more polarity scores comprise:
a strong negative score S1,
a weak negative score S2,
a neutral score S3,
a weak positive score S4, or
a strong positive score S5.

20. The non-transitory computer readable medium of claim 15, wherein the term frequency-inverse document frequency analysis is based on the frequency of the at least one of the plurality of sentiment oriented slang terms in the at least one document relative to the frequency of the at least one of the plurality of sentiment oriented slang terms in a corpus.

21. The medium of claim 15, further having stored thereon instructions that when executed by the processor cause the processor to perform steps further comprising:
identifying at least one of a plurality of sentiment oriented slang terms in the textual data that is classified as objective context; and
determining one or more polarity scores corresponding to each of the identified at least one of the plurality of sentiment oriented slang terms.

* * * * *